Figure 1:
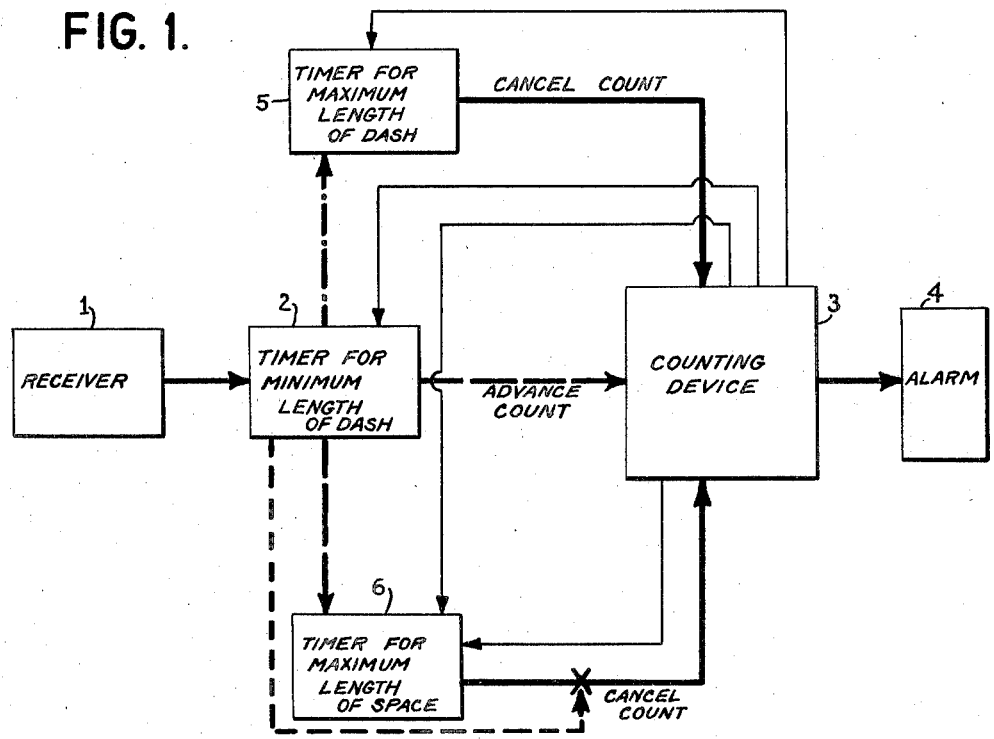

March 18, 1941.  W. W. MACALPINE  2,235,804
AUTOMATIC SIGNAL RESPONSIVE DEVICE
Filed March 23, 1937    4 Sheets-Sheet 1

INVENTOR
WILLIAM W. MACALPINE
BY Ed Thinney
ATTORNEY

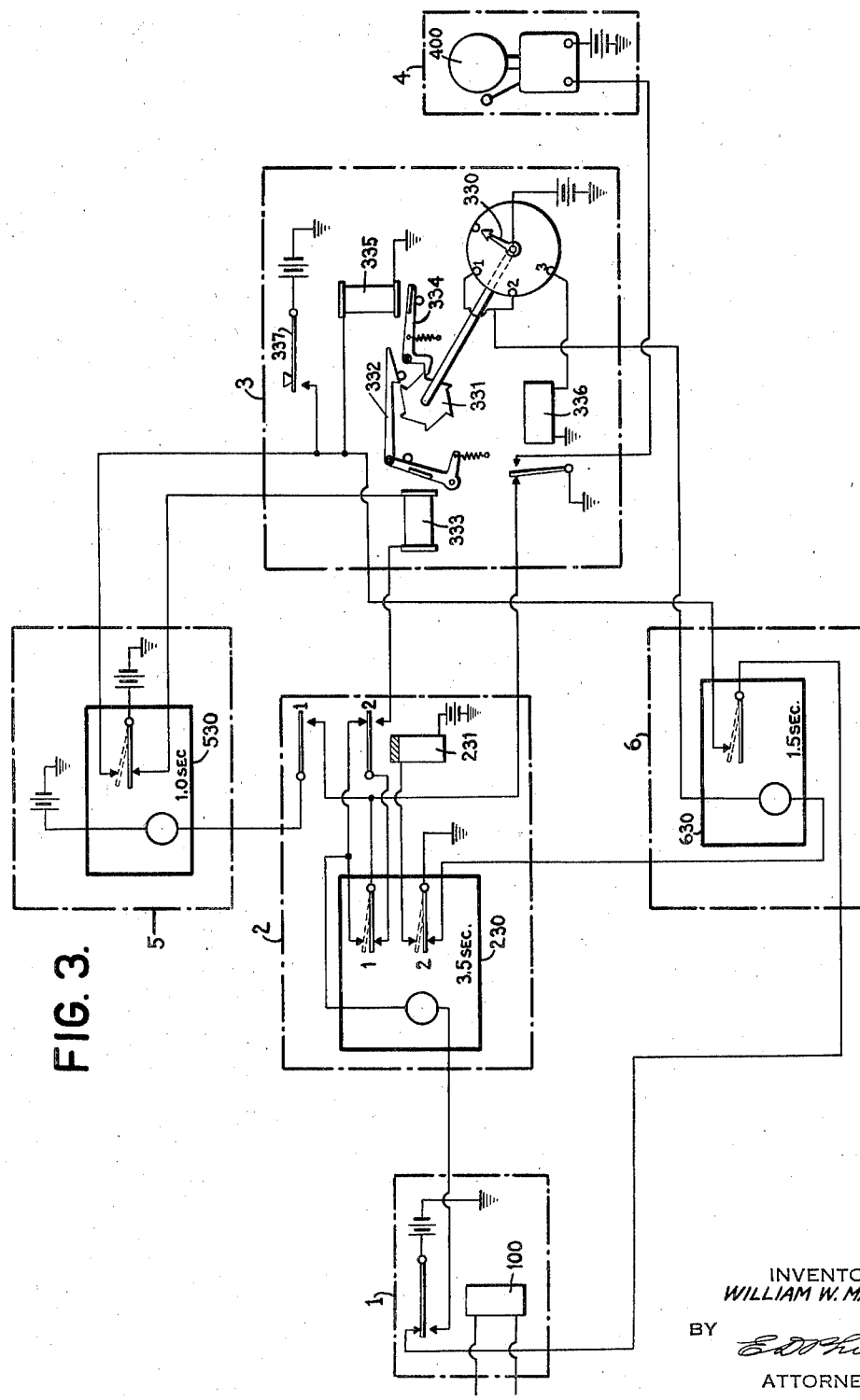

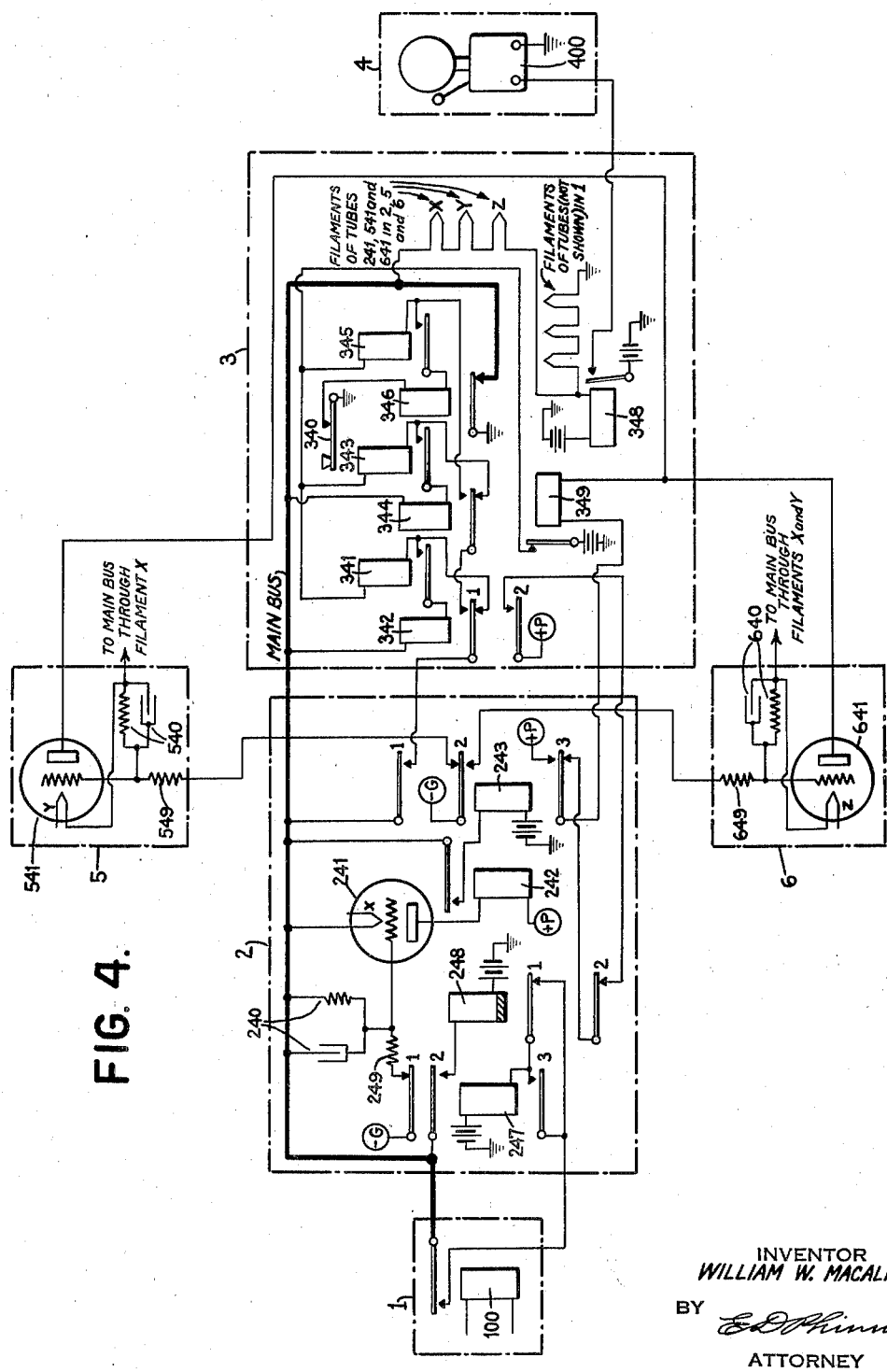

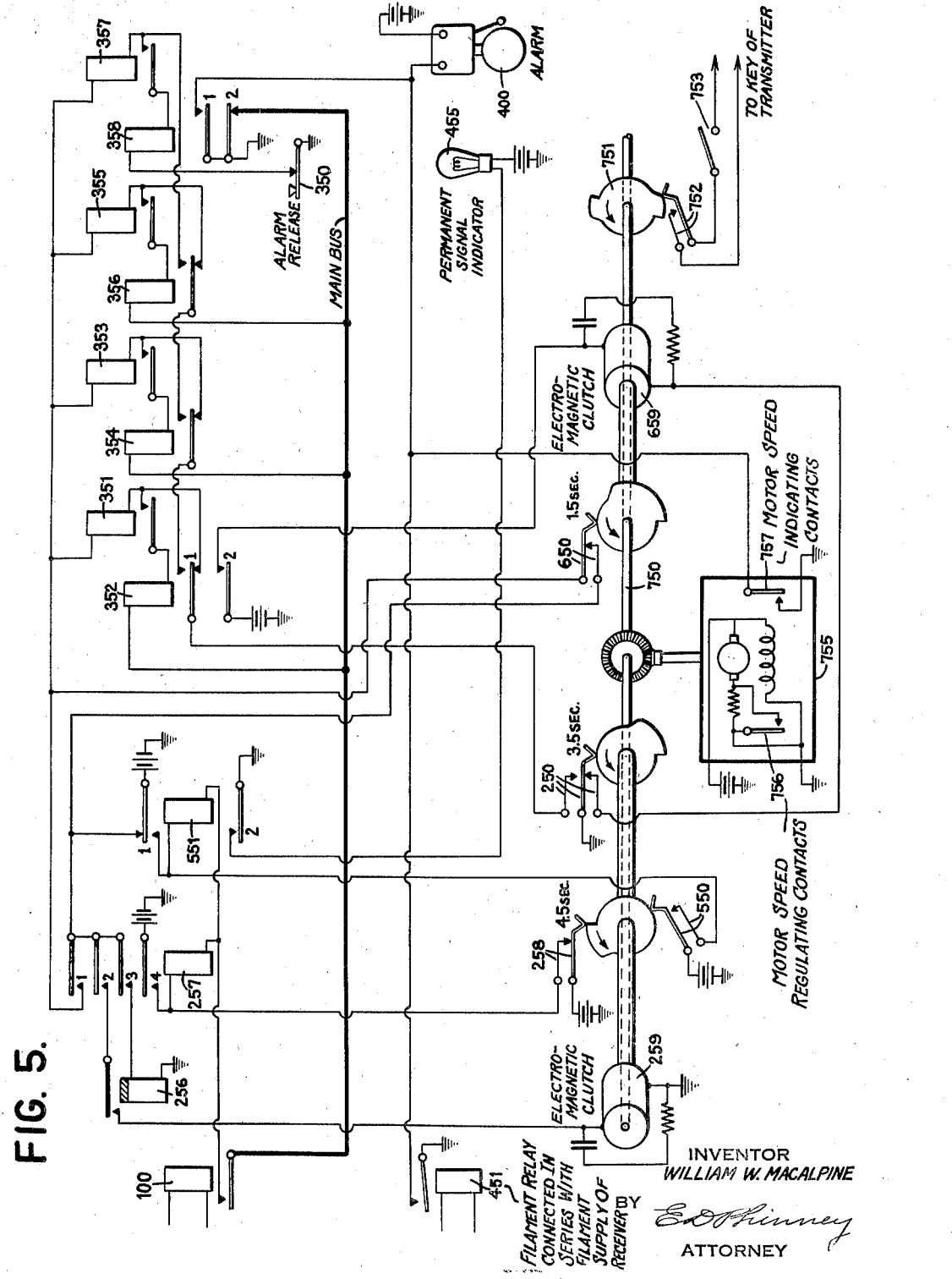

Patented Mar. 18, 1941

2,235,804

UNITED STATES PATENT OFFICE 2,235,804

AUTOMATIC SIGNAL RESPONSIVE DEVICE

William Walter Macalpine, East Orange, N. J., assignor to Federal Telegraph Company, Newark, N. J., a corporation of California Application March 23, 1937, Serial No. 132,551

3 Claims. (Cl. 177—353)

This invention relates to systems for indicating the reception of a predetermined signal and especially to systems intended to give an alarm when distress signals of a predetermined character are received. More specifically, this invention relates to a system for actuating an audible or visual alarm in response to the radio reception of a certain number of dashes of predetermined length separated by spaces of predetermined length.

It is an object of the present invention to provide a simple and effective selecting mechanism for responding to a group of dashes whose length and spacing are within certain limits. It is a further object of the present invention to provide a selecting device such that the reception of a signal will take place in spite of interferences caused by static or by interfering stations. It is a further object to provide such a system in which the possibilities of false alarm is reduced to a minimum consistent with reliable performance and certainty of response to correct signals. It is also an object to provide a system in which the reception of false signals will not disable the mechanism for reception of correct signals.

Particularly it is an object of the present invention to organize the different timing devices, counting devices, etc. which are incorporated in the signal selecting circuit in such a manner that a simple and reliable system will result in which the probability of false alarm is exceedingly low and yet the reliability of reception of correct signals is as high as possible.

The particular type of distress signal to which the described and illustrated embodiments of this invention are designed to respond is a series of dashes each of four seconds' duration spaced one second apart. To allow for variations in transmitting this signal dashes shall be considered correct if their length is between three and one-half and four and one-half seconds. Spaces shall be considered correct if their length is less than one and one-half seconds. Twelve consecutive correct dashes correctly spaced will ordinarily be transmitted. The receiving apparatus will, however, preferably respond to a smaller number of successive correct dashes correctly spaced. Three successive correct dashes with two correct spaces between them may actuate the receiver or four successive correct dashes with three correct intervening spaces may be required, according to the design of the device. The dashes should be unbroken but the spaces may be interspersed with dots or pulses of static or extraneous signals.

It is a particular object of the present invention to simply and reliably respond to a series of three or four successive dashes of the correct length and spacing in spite of extraneous signals, while avoiding the possibility of responding to signals which do not meet the above requirements.

Figure 2:
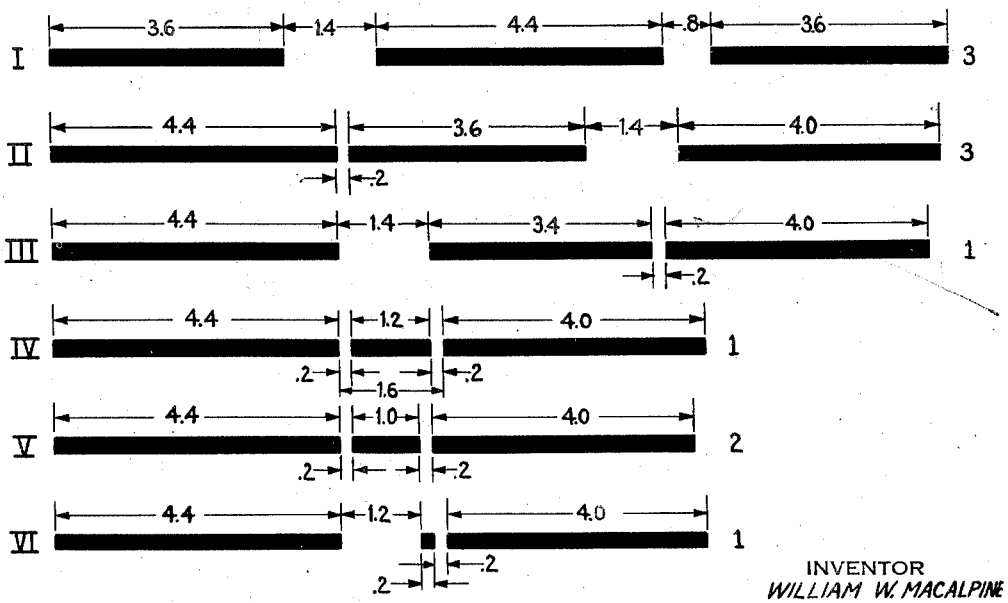

The arrangement for attaining these and other objects of this invention can best be understood by reference to the accompanying drawings in which Fig. 1 is a schematic block diagram illustrating the functional relation and organization of the different devices to form a complete system according to the present invention. Fig. 2 is a schematic illustration of six representative signal groups to which reference is made in describing the operation of the invention. Fig. 3 is a simple embodiment of the invention in which the different timing devices which form a part of the system are represented as generalized relaying devices which may be considered to be dash-pot relays, clockwork devices, or any other form of delayed action relaying devices. Fig. 4 represents another embodiment of the present invention in which the timing devices consist essentially of electrical delay networks, these networks being employed to control vacuum tube repeaters which in turn control the operation of ordinary telephone type relays of sensitive construction. Fig. 5 represents a third embodiment of the present invention in which the timing devices are all incorporated in one motor driven device having different cams adapted to be rotated under control of the different parts of the system.

Referring more particularly to Fig. 1, this figure shows schematically the preferred arrangement of the six separate assemblies which are combined to form a complete system in accordance with the present invention. In this diagram the connecting lines represent generally any connection whereby one device influences or controls the operation of another device. The arrowheads on these lines represent the direction of control or the sense of the cause-effect relationship between the two devices so connected. Although in many embodiments these lines are constituted by electrical connections it should be understood that these lines may equally well represent mechanical connections. It will be noted that the line extending from timer 6 to counting device 3 is interrupted by an X and that a dotted line extends from timer 2 to this X. This relationship of these lines represents the fact that timing device 6 is adapted to exercise a certain control over counting device 3 under normal conditions, but that timing device 2 is adapted to inhibit or disable this control so that timing device 6 will be ineffective to control the counting device 3 so long as the inhibiting or disabling effect of timing device 2 continues.

The dotted line extending from timing device 2 to X represents connecting means whose inhibiting action takes place immediately upon the actuation of the device 2 by receiver 1. The two dashed lines extending from timing device 2, on the other hand, represents connecting means whose control becomes effective only after the expiration of the interval measured by timing device 2. The dot-and-dash line extending from 2 to 5 represents connecting means whose control may be arranged to become effective immediately upon the actuation of 2 by 1 or alternatively may be arranged to become effective after the expiration of the interval measured by 2. Without departing from the spirit of the present invention the connection represented by the dotted line from 2 to X may be replaced by a connection from 1 to X. Similarly the connection represented by the dot-and-dash line from 2 to 5 could be replaced by a connection from 1 to 5.

Receiver 1 represents any device responsive to the signals to be received and is assumed to be substantially instantaneous in its response. It may for example be an ordinary tunable or fixed frequency radio receiver containing a relay operated in response to the signal.

Device 2 is a timing arrangement which is set in operation and restored to normal by receiver 1. This device 2 may for example be controlled from the contact of relay 100 comprised in the receiver.

Timing device 2 is adapted to pass a certain critical state in its progression whenever it is continuously operated for an interval of more than three and one half seconds and is arranged to transmit an actuating or controlling pulse to advance counting device 3 each time it passes this critical stage and then becomes restored to normal.

The actual advance of the counter may take place partially at the time device 2 reaches the end of its critical three and one-half second interval and partially at the time it is restored to normal, or the counter may be advanced only at the latter time. In any case the counter is advanced one full step each time device 2 goes through its cycle of continuously operating for more than three and one-half seconds and subsequently returning to normal. If device 2 performs an abbreviated cycle of operation for less than three and one-half seconds and then returning to normal, however, the counter will not be advanced. The advance of the counter is therefore in all cases essentially dependent upon the progression of timer 2 beyond its critical stage and this advance will be referred to as taking place "responsive to" the progression of timer 2 beyond its critical stage, even if the advance occurs at the time when device 2 is subsequently restored to normal.

Preferably at least part of the advance of counter 3 takes place upon the restoration of device 2 to normal, because such an arrangement facilitates suppressing the registration of a dash of excessive length—a feature which is especially important on the last dash of a signal. The suppression of such registrations is controlled by the auxiliary timing device 5.

The auxiliary timing device 5 is actuated and restored to normal either by receiver 1 or preferably by timing device 2. The actuation of 5 by 2 takes place preferably when the latter has been operated from 1 for a duration of three and one-half seconds. In this case the timing device 5 is adapted to measure an interval of one additional second. Therefore the timing device 5 will not terminate its interval until four and one-half seconds after the commencement of the dash as received by 2 from 1. This same result may also be obtained if timing device 5 is set into operation simultaneously with 2 when the latter is actuated by 1. In this case, of course, the total time interval measured by the timing device 5 would be four and one-half seconds instead of one second. The restoration to normal of 5 by 2 or 1 takes place upon the termination of the dash. In any case the timing device 5 is adapted, if it continues to operate to the end of its measure interval of time, to actuate the counting device 3 in such a manner as to cancel or uncount any pulses which may previously have been registered upon this counting device 3, as well as to prevent further advance of this counting device at the termination of the signal, in those arrangements where such further advance would otherwise take place. By this arrangement not only are dashes of excess length not registered and not effective for actuating the alarm 4 but also, the occurrence of such a dash of excess length will cause the cancellation of all previously recorded correct dashes, thereby insuring that a signal consisting of two correct dashes then an incorrect dash and then two more correct dashes will not be counted as if it consisted of four successive correct dashes.

The auxiliary timing device 6 is somewhat similar in function to the device 5 but is employed for measuring the excess length of the spaces between dashes rather than the excess length of the dashes themselves. This device 6 is preferably actuated from a normal or back contact of device 2 so as to become operative when 2 becomes inoperative, i. e. at the end of a dash. In case it is not desired to have device 6 normally operative when no signal is being received, an extra control may be introduced so that device 6 will only become operative after the counting device 3 has registered at least one impulse. Such an auxiliary control is schematically indicated by the light line connecting counting device 3 with timing device 6. In any case, timing device 6 is arranged so that after measuring a suitable interval of time (one and one-half seconds) it will tend to actuate the counting device 3 so as to "uncount" or cancel all pulses previously recorded in the device 3. By this arrangement not only is a space of excess duration ineffective for furthering the counting but such a space also serves to cancel all dashes previously counted. Therefore, the counting will not become effective to actuate alarm 4 unless three, or four if machine is so designed, successive dashes separated by correct spaces are received. However, the timing device 6 is rendered inoperative and restored to normal only after the device 2 has actually measured its allotted interval of three and one-half seconds. In other words, 6 is disabled by 2 only after 2 has received a pulse of three and one-half seconds duration from 1. Although the device 6 is not disabled from operation and restored to normal until 2 has actually completed its three and one-half seconds timing interval, the device 6 is prevented from "uncounting" the pulses in device 3 as soon as the device 2 begins to receive a signal pulse from device 1.

Therefore, after one dash has been received and the timing device 6 has commenced to measure the space after that dash, the arrival of the next dash will disable the timing device 6 from cancelling the pulse recorded in mechanism 3 but will not disable this timing device 6 from operating nor restore it completely to normal. Therefore, if an interruption is received in this second dash before the timing device 2 has completed its three and one-half second interval and has restored 6 to normal, that interruption will cause the complete cancellation of all impulses recorded in 3 in the following manner: The interruption of the dash in receiving equipment 1 will interrupt the actuating influence from 1 to 2, which will in turn allow 2 to return to normal; the return to normal of 2 while 6 is still operative, will remove the disability of 6 so that the latter can return the counting device 3 to its normal state. Therefore, a dash of less than three and one-half seconds duration or a dash which has an interruption sooner than three and one-half seconds after its beginning will not only fail to actuate 2 and thus fail to further count the counting device 3 but will also, if it is not the first dash, permit the counting device 6 to restore the counting device 3 to normal, thus cancelling all previous pulses which may have been counted. This feature also enables the system to respond satisfactorily to signals which may contain extraneous dots inside of the space interval so that these spaces are apparently divided into a number of shorter spaces filled in by short pulses of signal. Such a filling in will not disturb the operation of the present system unless the space is completely filled in or unless the filling in occurs at the extreme beginning or end of the space and thus lengthens the preceding or following dash beyond the permissible limit or four and one-half seconds. Control of timing device 6 from timing device 2 is one of the valuable features of the present invention since this organization of these two timing devices provides a system in which the timing device 6 will totally ignore small intervals or dots of signal which may be interspersed in the space whose duration it is desired to measure and at the same time this organization also insures that the reception of a dash whose length is less than the minimum permissible amount (three and one-half seconds) will not only fail to register in the counting device but will also, as previously explained, cause the cancellation of all pulses previously registered in this counting device.

The control of the timing device 5 from the timing device 2 has the advantage that the time to be measured by device 5 is not the whole length of the maximum permissible dash (four and one-half seconds) but only the excess of this length over the minimum length (four and one-half seconds less three and one-half seconds equals one second). Since it is ordinarily more difficult to measure longer time intervals, there are in many forms of this invention valuable savings in cost and equipment which may be effected by the above described cascade connection of the timing devices 2 and 5. In other embodiments, however, where the difficulty of timing a four and one-half second interval is not appreciably greater than the difficulty of timing a one second interval, it may be preferred to start device 5 simultaneously with device 2. In such a case, device 5 may either be controlled from device 2 as shown or may be controlled directly from device 1 by connecting device 5 either in shunt or in series with device 2.

The operation of the present device in response to ordinary telegraphic signals consists merely in the repeated operation and restoration to normal of device 1. Upon each operation of device 1 timing device 2 is started and perhaps timing device 5 is also started but since the duration of ordinary telegraphic signals is less than three and one-half seconds neither of these devices will become effective to actuate any further devices before 1 is restored.

The operation of the system in response to a series of dashes of correct length separated by spaces of correct length is as follows: 1 operates at the beginning of a dash, thus starting 2 (also starting 5 if 5 is adapted to be started immediately upon the energization of 2). After three and one-half seconds 2 passes the critical stage in its progression. (The starting of 5 will occur now if not earlier.) The passing of this critical stage by device 2 determines the advance of counting device 3. This advance may be partially performed at this time but preferably is not completed till the end of the dash. Finally when the dash terminates, with a duration shorter than four and one-half seconds, 1 and 2 will be restored to normal and at the same time 2 will actuate 3, completing the counting of the dash. At the termination of the dash also 5 ceases timing and returns to normal and 6 begins to measure the space interval. Timer 6, however, will presumably not become effective to cancel the count since the space is assumed to be correct (i. e. less than one and one-half seconds). At the start of the next dash, 1 and 2 will again be actuated and 5 may also be started as before. The actuation of timer 6 will not be stopped at once but the possibility of this timer cancelling the count previously registered in 3 will be inhibited or prevented by timing device 2 as indicated by the dotted line from 2 to the connection between 6 and 3. After three and one-half seconds 2 will terminate the timing action of device 6 and restore this device to normal. At the same time 2 will pass its critical stage to determine the counting of another dash as mentioned above for the first dash and at the successful termination of the dash, 2 will actuate 3 to register another dash. This whole action will be repeated three or four times depending upon whether counting device 3 is adapted to register three or four dashes before actuating alarm 4. Then alarm 4 will be actuated by counting device 3.

Alarm 4 may be arranged to lock itself in its active condition so that it will continue to indicate the reception of the signal, in which case it is not necessary to restore the rest of the system to normal. Preferably, however, device 3 is arranged to restore all or a part of the other devices to normal, and to prevent their further actuation, as indicated by the light lines extending from the top of device 3 to devices 2, 5 and 6.

The operation of the system in response to incorrect signals of different types can be readily understood from Fig. 1 diagram together with the above description. Whenever a dash of more than four and one-half seconds in length is received device 5 will restore the counting device 3 to normal. Whenever the space between two dashes exceeds one and one-half seconds in length, device 6 will similarly restore the counting device 3 to normal. It should be noted that device 6 will act to restore the counting device to normal if the space between dashes exceeds one and one-half seconds even if part of this space is filled up by one or more short signal pulses or dots, unless these dots occur at the very beginning or end of the space and are continuous with the preceding or following dash in such manner that the resulting space is less than one and one-half seconds. The reason for this action is that timing device 6 is not restored to normal immediately upon the resumption of signals and the activation of device 2 by device 1, but rather continues to measure its interval of time until the signal has continued for three and one-half seconds, at which time device 2 terminates the timing of device 6 and restores the latter to normal. It should be noted also, that if after a correct first dash and a correct ensuing space the second dash consists of a pulse of current or signal less than three and one-half seconds long, followed by a brief interruption and then again followed by a third signal pulse which is approximately correct in length, the present system will not record these second and third dashes jointly as a correct second dash and will, in fact, cancel the previously counted dashes as soon as the interruption occurs. This again results from the fact that the timing device 6 becomes active to cancel pulses recorded in the counting device after an interval of one and one-half seconds from the end of the first dash—whether another dash has then commenced or not—and this timer 6 remains active during the early part of the second dash (until at least three and one-half seconds of this second dash have elapsed). During this early part of the second dash the timing mechanism 6 is prevented from actually cancelling the indication registered in the counting device 3 by the fact that timer 2 is continuously energized from receiver 1. Thus when 2 becomes momentarily deenergized by the interruption following the second dash (before this dash has lasted three and one-half seconds and therefore before 2 has restored timer 6 to normal) such deenergization of 2 will permit timing device 6 to reset the counting device 3. Signal group III in Fig. 2 may be considered as representing three such dashes of which the second is three and four-tenths second long. Such a signal will, in accordance with the present invention, register only one single dash (the last one) since all previous registrations will be cancelled by the interruption occurring after the second dash. It should be noted, however, that an interruption occurring after the second dash has lasted less than three and one-half seconds will not cancel all previous registrations provided this interruption terminates within less than one and five-tenths seconds after the previous correct first dash ended. Signal V in Fig. 2 shows such a condition. In accordance with the present invention such a signal group would be counted as two dashes since at the time of the second interruption timing device 6 would not yet have reached that stage at which it tended to reset counting device 3.

Referring more fully to Fig. 2, the signal groups designated as I and II would be registered by the system of this invention as three dashes, signal III would be registered as one dash; signal IV would count as one dash; signal V would count as two dashes; and signal VI would be counted as one dash. This is because in codes I and II the second pulse of current is counted as a second complete dash. In code III the second pulse of current is counted as a second dash but is of insufficient length and therefore causes the cancellation, by device 6, of all previously registered pulses—the first dash in this case. In code IV the second pulse of current may be considered as a dash of insufficient length as in the case of II, but is preferably regarded as an extraneous pulse in the space period. The space being in excess of one and one-half seconds, the count is erased. In code V, however, the second pulse of current is regarded as an extraneous dot or pulse filling in part of the space between two perfect dashes; this is because in the case of code V both interruptions together with the second pulse of current between them occupy a total time of less than one and five-tenths seconds. In code VI the two spaces together with the dash between them, however, occupy a total time interval of more than one and five-tenths seconds, so that in this case the second pulse of current may be considered as an extraneous dot occurring inside of a space which is longer than the maximum limit. This code, therefore, will register only one dash (the last one). As a matter of fact, this code VI is exactly equivalent to codes III and IV although these different codes appear somewhat different, and the operation of the system in cancelling all previously counted dashes at the occurrence of the second interruption is the same in the case of each of these three codes, III, IV and VI.

Referring now more particularly to Fig. 3, which represents in greater detail one possible embodiment of the present invention, it will be noted that in this embodiment also, the separate component devices which are combined to form the complete system are again designated by the same reference numerals as before: 1, 2, 3, 4, 5 and 6. The three timing devices 2, 5 and 6 have been shown as including relaying devices 230, 530 and 630, respectively. These relaying devices have not been illustrated in great detail but have been represented merely by symbolic rectangles in which are shown a number of contacts to be moved from the rest position in which they are shown, to the actuated position indicated by dotted lines. In each of these relaying devices the operating magnet or winding or armature through which currents must be passed to start the actuation of the relaying device is illustrated by a small circle. In the devices 2, 5 and 6, it will be understood that each of the relaying devices 230, 530 and 630 represents some form of relaying device in which the movement of the contacts to their dotted position takes place at a fixed interval of time after the energization of the actuating winding or magnet or armature represented by the small circle in each of these devices. The delay in operating the contacts may be governed by mechanical delay means, for instance by simple inertia means such as a flywheel or by a pneumatic dashpot or a clockwork; or by electrical delay means or magnetic delay means of any suitable type. In the case of relaying device 2 the delay is three and one-half seconds, in the case of relaying device 5 the delay is one second, and in the case of relaying device 6 the delay is one and one-half seconds. In the case of each one of these devices it is assumed that there is little delay in restoring the contacts and all the rest of the mechanism to its original condition after the actuating pulse terminates. Relay 231 in device 2 is of the ordinary slow-release type having a release delay of the order of one-tenth of a second. By nature such a relay is slower to operate than an ordinary relay.

The counting device 3 comprises essentially a step-by-step rotary switch 330 which is adapted to be rotated counterclockwise three steps from its home position by means of ratchet wheel 331, which is actuated by means of pawl 332 in response to the energization of counting magnet 333. A return spring, not shown, constantly tends to restore this rotary switch 330 to its home position but the detent 334 normally holds the ratchet wheel 331 in the position to which it has been set until this detent 334 is disengaged by energization of the release magnet 335, in which case the switch returns to its home position. In addition to this rotary switch 330 and its associated stepping and restoring mechanism above described, the counting device 3 also includes a relay 336 and a release key 337. The relay 336 may be of any ordinary type.

The alarm device 4 is shown as comprising a simple electric bell 400. The device 1 represents a signal receiving equipment containing a relay or contact closing device 100. It is assumed that this signal receiver is an ordinary radio receiver adapted for use on a fixed frequency band and having a sensitive relay included in the plate circuit of its output stage. The receiving equipment itself is not shown, only the sensitive relay 100 and its contacts being illustrated.

The operation of this system in response to a signal comprising three dashes of correct length occurring consecutively and separated by spaces of correct length will now be described. At the start of the first dash, relay 100 operates, energizing the actuating element—armature or winding or magnet—of timing device 230 over the following circuit: ground, battery, front contact of 100, actuating element of 230, #2 back contact of 231, #1 back contact of 230, back contact of 336, to ground. Timing device 230 now commences to measure an interval of three and one-half seconds and at the end of this interval, if the dash has not been interrupted and is still continuing, device 230 actuates its contacts to the dotted position. The brief interval between the operation of 231 and that of 230 (assured by the relatively slow closing of 231 previously referred to) precludes the possibility of #2 front contact of 231 closing before #1 back contact of 230 opens. The operation of these contacts breaks the above traced circuit through the actuating element of device 230 itself but the #1 contact of this device 230 is arranged to make before it breaks so that a substitute circuit is previously closed. The operation of the contacts of device 230 also closes the following circuit for energizing relay 231: ground, battery, relay 231, #2 front contact of 230 to ground. Relay 231 thereupon operates closing a circuit for the actuating element of timing device 530 as follows: ground, battery, actuating element of 530, #1 front contact of 231, back contact of 336 to ground. Timing device 530 now commences to measure a further interval of one second. If the dash is longer than four and one-half seconds, timing device 530 operates its contacts closing an obvious circuit for release magnet 335 and also preventing the closure of any circuit for stepping magnet 333. These contacts now remain operated until 530 is released by the release of relay 231. Since switch 330 is already in its home position the energization of the release magnet is of no consequence. The disabling of the circuit of stepping magnet 333, however, is effective to prevent the operation of this magnet which would otherwise occur at the end of the dash as hereafter explained.

Assuming that the first dash is of correct length however the above mentioned operation of the contacts of 530 does not take place before the signal ceases. Upon the cessation of the signal relay 100 is released, thus causing the release of timing device 230 which rapidly returns to normal. The restoration of the contacts of 230 deenergizes relay 231 which however requires a short time to release. Pending the release of relay 231 a circuit is closed for magnet 333 as follows: ground, battery, back contact of 530, magnet 333, #2 front contact of 231, #1 back contact of 230, back contact of 336 to ground. Magnet 333 thereupon operates pawl 332 to step switch 330 to its #1 contact. Thereafter relay 231 releases causing the release of magnet 333, as well as the restoration to normal of timing device 530. The slow release feature of relay 231 serves two useful purposes. First, the magnet 333 is actuated for a period of one-tenth of a second, allowing sufficient time for the proper operation of pawl 332 and switch 330. Second, upon the cessation of the signal and consequent release of timing device 230, an interval of one-tenth of a second is available before #2 back contacts of 231 close. During this interval, device 230 cannot again be energized even though a second dash commences and causes relay 100 to operate. Ample time is thus provided for the return of 230 to normal. The interlocking of #1 contacts of 230 with #2 contacts of 231 renders it impossible that a very rapid succession of received pulses in 1 immediately following the cessation of the dash can cause a corresponding succession of impulses to magnet 333.

The stepping of switch 330 to its #1 contact closes a circuit for timing device 630 as follows: ground, battery, #1 contact of 330, actuating element of 630, #2 back contact of 230 to ground. Timing device 630 thereupon commences to measure an interval of one and one-half seconds which represents the maximum length of a correct space between dashes. Since the operating circuit just traced for timing device 630 is independent of relay 100 the operation of 630 will not be affected by incoming signals unless and until a continuous dash of three and one-half seconds length is received which is capable of causing timing device 230 to actuate its contacts. Therefore after one and one-half seconds from the end of the first dash the contact of timing device 630 will become actuated whether or not the space after the first dash has been partially filled in by short dots of static or extraneous signals. In fact the contact of the spacing timing device 630 will become actuated after one and one-half seconds from the end of the first dash even if at that time the space has really terminated and the second dash has commenced. The effect of the actuation of the contact of timing device 630 is to operate the release magnet 335 unless the relay 100 is in the actuated position continuously from the time 630 operates until 630 is again restored to normal. For this reason, even if a dot or short impulse of signal is arriving just at the termination of the one and one-half second interval when timing device 630 actuates its contact, this short pulse of signal will not prevent the release of the counting equipment but will only delay it, unless this pulse of signal lasts continuously for three and one-half seconds so as to cause the operation of timing device 230 and the restoration of timing device 630 before relay 100 releases. In this latter case, although the contact of 630 will be actuated, that contact will be ineffective, because the circuit through that contact will be at all times open at the contact of relay 100.

Upon the assumption that the second dash arrives before the space between the dashes has exceeded one and one-half seconds, the action will be exactly as outlined just above, namely, the arrival of the second dash will, by operating relay 100, prevent the contact of timing device 630 from closing a circuit for release magnet 335. The operation of relay 100 in response to this second dash will also operate timing device 230, as in the case of the first dash. Since timing device 630 remains in its actuated position with its contact closed, until timing device 230 finally becomes actuated after three and one-half seconds, it will be apparent that a break in this dash occurring sooner than three and one-half seconds after its beginning will not only permit timing device 230 to return to normal, as in the case of a broken first dash, but will also permit a circuit to be closed as follows: ground, battery, back contact of 100, front contact of 630, release magnet 335 to ground. This circuit will, of course, operate the release magnet 335 which will restore the switch 330 to normal, thus wiping out the registration of any prior dashes which may have been counted. Upon the assumption that the second dash continues without interruption for at least three and one-half seconds, timing device 230 will finally actuate its contact, thus deenergizing timing device 630, which will then return to normal. From here on the operation proceeds as in the case of the first dash. If the dash is too long (more than four and one-half seconds) timing device 530 will operate and cause the release of the counting mechanism 3 as well as preventing the reoperation of this counting mechanism upon the subsequent release of timing device 230. Upon the assumption, however, that the second dash is not more than four and one-half seconds in length the timing device 230 will become restored to normal by the release of relay 100 at some time after timing device 630 has returned to normal. Upon the restoration of timing device 230 and prior to the ensuing release of relay 231, stepping magnet 333 will again receive another pulse, causing the stepping of rotary switch 330 to its second position. Upon the release of relay 231 timing device 530 will be restored to normal.

The operation of the mechanism for timing the space after the second dash is the same as the operation for timing the space after the first dash. The operation of the mechanism for timing the length of the third dash and for detecting interruptions in that third dash which occur sooner than three and one-half seconds after its commencement, is the same as described in connection with the second dash. If the third dash is correctly registered, therefore, the rotary switch 330 will be stepped to its third position. The arrival of this switch in its third position closes an obvious circuit for relay 336, which then causes the operation of alarm 400. The operation of this relay 336 also prevents further operation of timing devices 2 and 5. The stepping of the rotary switch to its third position prevents further operation of the timing device 6. Only relay 100 therefore, will continue to operate in response to further signals, but the rest of the equipment will remain fixed, with switch 330 in its third position, relay 336 operated, alarm 400 active, and all the rest of the equipment restored to normal.

By operating key 337, release magnet 335 will cause the switch 330 to return to normal, thus releasing relay 336 and cutting off the alarm. By this action the complete system will be restored to normal.

It should be noted that the system above described and shown in Fig. 3 is, in its organization and relationship of component devices, exactly equivalent to the system schematically shown in Fig. 1, excepting that the inhibiting or disabling means for preventing device 6 from causing the release of device 3 is, in this system of Fig. 3, under the control of device 1 rather than under the control of device 2. This inhibiting device in the system of Fig. 3 consists of the back contact of relay 100 and the wire connecting that back contact to the movable contact of the timing device 630.

Another embodiment of the present invention having essentially the same basic organization of component parts as the system shown in Fig. 1, is shown in Fig. 4. In this embodiment of my invention the essential timing elements for devices 2, 5 and 6 are constituted by electrical delay networks illustrated as composed of resistance and capacitance elements. These electrical timing elements are connected to control the grid potential of three vacuum tube repeaters, which in turn supply the plate current for operating the relays 242 and 349. The counting device 3 in this embodiment consists essentially of a counting chain of well known type, adapted to count three pulses. It is, of course, apparent that the counting chain might be arranged to count four pulses or any other number as desired.

Since the essential organization of this embodiment is similar to that of Fig. 1 the discussion and analysis given above with regard to Fig. 1 can be, in general, applied to Fig. 4 also.

The operation of this embodiment in response to the reception of three correct dashes correctly spaced, is as follows: Upon the arrival of the first dash, relay 100 operates, closing the following circuit for relay 247: battery, relay 247, #1 back contact of 248, front contact of 100 to the main bus. The main bus can be seen to be normally connected to ground through the back contact of relay 346; and since the battery is also grounded, this completes the above traced circuit. The operation of relay 247 substitutes the #3 front contact of 247 for the #1 back contact of 248. The operation of 247 also closes a circuit for 248 as follows: battery, relay 248, #2 front contact of 247 to the main bus. Also, the operation of 247 disconnects the source of negative grid bias designated "—G" from the grid of vacuum tube 241. Relay 248 which is designed to be slow to release and is therefore slightly sluggish in operation, operates very shortly after the operation of 247. The grid of vacuum tube 241 commences to become less negative at a rate determined by the time constant of electrical network 240. After three and five-tenths seconds the negative potential of the grid of 241 becomes sufficiently low so that the plate current through the latter can actuate relay 242 through the following circuit: positive plate supply (designated "+P"), relay 242, tube 241, to the main bus. The operation of relay 242 closes a circuit as follows: battery, relay 243, front contact of 242, main bus. This extra relay, 243, is provided merely to avoid the necessity of providing the sensitive plate relay 242 with a plurality of contacts. The operation of this relay 243 causes the operation of the first counting chain relay 341 over the following circuit: battery, back contact of 349, relay 341, #1 back contact of 342, #1 front contact of 243 to the main bus. The operation of relay 243 also connects the source of positive plate potential (designated "+") to relay 349. Slightly previously the operation of relay 243 disconnects the negative grid bias (designated "—G") from the grid of vacuum tube 541 and connects this potential to the grid of vacuum tube 641. Vacuum tube 641, therefore, becomes non-conducting almost instantaneously while the grid of vacuum tube 541 slowly becomes less negative at a rate determined by the constants of electrical network 540. Network 540 is adjusted so that after an interval of one second vacuum tube 541 will become sufficiently conducting to actuate relay 349.

Upon the assumption that the dashes are of correct length, however, the signal will terminate before relay 349 becomes energized. Such termination of the signal will cause the release of relay 100, then of relay 247, then of relay 248. The release of relay 247 instantly renders tube 241 non-conducting by applying negative grid bias to its grid, the only delay being due to the protective resistor 249. At this point it may be noted that whenever relay 247 releases relay 248 prevents its reoperation for a short interval, thus insuring that every release of relay 247 lasts long enough to fully charge the grid of vacuum tube 241 to its equilibrium potential. Relay 242 now releases because of the lack of plate current through tube 241. Relay 242 causes the release of relay 243 in obvious manner. The release of relay 243 opens at its #1 front contact, the circuit previously traced for counting relay 341, whereupon the latter locks up in series with relay 342, actuating this relay 342. The circuit is as follows: battery, back contact of 349, relay 341, front contact of 341, relay 342 to the main bus. The release of relay 243 also removes the source of negative bias from the grid of vacuum tube 641 and connects it to the grid of vacuum tube 541, so that 541 becomes non-conducting almost instantaneously, while 641 commences to return to a conducting condition at a rate determined by the electrical network 640. It will be noted that at this time, in spite of the release of relay 243, positive plate potential is connected to the winding of relay 349 through the #2 front contact of relay 342, #2 back contact of relay 248, #3 back contact of relay 243. Electrical network 640 is adjusted so that after 1.5 seconds tube 641 will become sufficiently conducting to energize relay 349.

Upon the assumption, however, that the dashes are correctly spaced, the second dash will commence before the relay 349 has become energized. Upon the arrival of the second dash, relays 100, 247, 248 vacuum tube 241, relays 242 and 243 will be successively energized just as in the case of the first dash. This time however the operation of relay 243 will close a circuit for relay 343 instead of relay 341 (battery, back contact of 349, relay 343, back contact of 344, #1 front contact of 342, #1 front contact of 243, main bus).

The operations of the apparatus in response to the second space and the third dash are similar to its operations in response to the first space and the second dash, respectively. At the end of the third dash therefore relay 346 will become operated in the same way that relay 342 became operated at the end of the first dash. Upon this operation of relay 346 ground is disconnected from the main bus, thus restoring to normal all the apparatus except relay 100 and the two relays 345 and 346, which remain energized in series with one another. The removal of ground from the main bus also interrupts the filament circuit for the three filaments $x$, $y$ and $z$ of vacuum tubes 241, 541 and 641, respectively. These three filaments are connected in series and fed through the winding of relay 348 as indicated in the right-hand portion of the drawing. Preferably the filaments of the vacuum tubes employed in the receiver 1 are also fed through this same relay 348, these receiver filaments being connected in shunt with the selector tube filaments $x$, $y$ and $z$. The relay 348 is so adjusted, however, that upon the failure of either one of these filaments circuits, the relay will release. Therefore, upon the removal of ground from the main bus and the consequent interruption of the filament currents through filaments $x$, $y$ and $z$, relay 348 releases, actuating the alarm 400. Because of the removal of ground from the main bus, devices 2, 3, 5 and 6 become inoperative, and, therefore, no further action will take place in response to further signals, except the operation of relay 100.

To restore the system to normal key 340 is depressed, releasing relays 345 and 346. The release of relay 346 replaces ground on the main bus thus relighting filaments $x$, $y$ and $z$ and reoperating relay 348. The alarm is thereby turned off and the whole system brought into condition for further operation.

Fig. 5 shows a preferred form of the present invention, in which the timing is performed by means of cams adapted to be driven by a constant speed motor. The general organization of this embodiment corresponds closely to the system shown in Fig. 1, if it is assumed that timing device 5 of Fig. 1 is placed into operation simultaneously with timing device 2 and that the timing device 5 has a timing interval of 4½ seconds.

Upon the assumption that four dashes of correct length separated by three spaces of correct length are received, the operation of the system shown in Fig. 5 is as follows: Relay 100 operates at the commencement of the first dash, closing the following circuit: battery, cam-springs 258, relay 257, front contact of 100, main bus. Relay 257 operates, closing the following circuit: battery, No. #1 back contact of 551, #3 front contact of 257, relay 256, ground. Relay 256 operates, closing the following circuit: battery, #1 back contact of 551, #2 front contact of 257, front contact of 256, clutch 259, ground. Clutch 259 causes the engagement of the two left-hand cams with the constantly rotating shaft 750 which is driven by constant-speed motor 755. Almost immediately cam operated springs 258 open but at this time relay 257 has a substitute battery feed through its own #4 front contact. After 3½ seconds cam operated springs 250 close the following circuit for counting relay 351: battery, #1 back contact of 551, #1 front contact of 257 (or cam springs 650), relay 351, #1 back contact of 352, springs 250, ground.

If the signal pulse should continue for more than 4½ seconds cam operated springs 550 would cause the operation of relay 551 over an obvious circuit. This action would cause the release of relay 256, clutch 259, and any of the counting relays 351—358 which might at that time be operated (in this case only relay 351).

Upon the assumption that the signal ends before the closure of spring 550, however, relay 100 releases, causing the successive release of 257, 256 and 259. As a result of the deenergization of clutch 259, the two left-hand cams are restored to their home position by a spring not shown. This restoration occurs very nearly instantly, but in case a second pulse of current should arrive before the restoration is completed, spring 258 will prevent the reoperation of relay 257 until the cams are completely restored to normal. The restoration to normal of these two cams permits springs 250 to return to their normal position, thus breaking the circuit above traced for counting relay 351, which thereupon locks up in series with counting relay 352, energizing the latter. The circuit extends through battery, #1 back contact of 551, springs 650, relay 351, front contact of 351, relay 352 to the main bus. Energization of relay 352 together with the return to normal of spring 250 closes the following circuit: battery, #2 front contact of 352, clutch 659, springs 250, to ground. By the energization of electromagnetic clutch 659 the cam which controls springs 650 is caused to rotate, thus starting the timing of the space between dashes.

If springs 650 open before the arrival of the next dash, the circuit of counting chain relays 351—358 is opened, thus releasing any of these relays which may be operated, in this case relays 351 and 352 only. Upon the assumption, however, that the space between the dashes is of the correct length, a new signal will arrive before springs 650 are open. Relays 100, 257, 256, will operate as before and clutch 259 will be energized as before, causing the two left-hand cams to commence their rotation again. The operation of relay 257 provides at its #1 front contact, a by-pass around springs 650, so that the subsequent opening of these springs will be ineffective to restore the counting chain as long as relay 257 remains continuously operated.

As previously explained in connection with Fig. 1 and other figures, the timing device 6 does not immediately return to normal. The clutch 659 continues to be energized and the cam which controls springs 650 continues to rotate until springs 250 again become operated, i. e., until after the next dash has lasted for 3½ seconds. The operation of springs 250 then releases clutch 659, whereupon the cam which controls springs 650 is almost immediately restored to normal under the influence of a spring not shown. The operation of springs 250 also causes transmission of another pulse to the counting chain, operating relay 353 as follows: battery, #1 back contact of 551, #1 front contact of 257 (or cam springs 650), relay 353, back contact of 354, #1 front contact of 352, springs 250, ground.

In a similar manner the succeeding dashes and spaces are counted, springs 250 serving to measure the minimum length of each dash, springs 550 serving to measure the maximum length of each dash, and springs 650 serving to measure the maximum length of each space. At the end of the fourth dash when relay 358 becomes operated in a manner analogous to the operation of relay 352, ground is removed from the main bus by the #2 back contact of relay 358. By the removal of this ground all relays except 357 and 358 are released. Relay 100 is free to operate in accordance with further incoming signals, but the operation of this relay will have no effect. The alarm 400 is energized over the #1 front contact of 358.

By depressing release key 350, relays 357 and 358 may be released, thus restoring ground to the main bus and returning all the equipment to normal. The alarm 400 is adapted to be actuated not only by the relay 358 of the selector mechanism but also by the filament relay 451 which is connected in series with the filament supply of the receiver equipment (not shown) so as to cause the sounding of the alarm whenever the filament currents drop below the proper value. The constant speed driving motor 755 is also provided with speed indicating contacts 757 to sound the alarm 400 when the motor speed falls below (or above) a certain value. This motor 755 is shown as also having a speed-regulating contact 756 which serves to short-circuit a resistor in the armature circuit when the motor speed falls below the proper value. It is understood, however, that any type of governor-controlled or inherently stable motor may be used which will have a sufficiently constant speed characteristic. A "permanent signal" indicator (illustrated as a lamp 455) is connected to the #2 front contact of relay 551 to give a warning indication whenever this relay is operated. Since signals having a length of more than 4½ seconds are rare, this "permanent signal" indicator should be very infrequently illuminated. If it is frequently illuminated or if it remains illuminated for a considerable time, it serves to indicate either that the receiver is too sensitively adjusted and is picking up stray signals and static to too great an extent, or that some failure has occurred in some portion of the mechanism.

A pair of transmitting springs 752 are arranged to be constantly operated from a cam 751 permanently fixed to the main drive shaft 750 of the selector mechanism. By means of a switch 753 these contacts may be connected in parallel with the key of the ship's transmitter so that this cam may be used for automatically sending accurately timed dashes and spaces as long as the switch 753 remains closed.

The selector shown in this figure is preferably so connected to a switch (not shown) that the receiver 1 and the selector shown in Fig. 5 are supplied with operating potentials whenever the regular ship's receiver is disconnected. In this way it is rendered improbable that the operator will leave his post of duty and turn off the regular receiver without putting the automatic alarm system into operation. The motor 755 is designed in the preferred embodiment to be operated during all the time the automatic alarm receiving system is in use. In case a rapidly starting motor of reliable time characteristic is used, it may however be suitable to arrange this motor to be started only when one or more of the relays of the selector circuit are operated.

The relay 256 is provided for the purpose of preventing the operation of clutch 259 in response to every brief telegraphic pulse or static crash of a fraction of a second in length. This relay 256 is arranged to be slow to operate, having an operating time of the order of one-half or one-quarter of a second, for example. The delay in time of operation of relay 256 must of course be compensated for in the timing of the cams operating contacts 250, 258 and 550. Since such a relay is inherently somewhat sluggish in releasing also, the circuit is designed so that the breaking of the circuit of clutch 259 is not dependent upon the releasing time of relay 256, although the operating time of relay 256 does serve to delay the operation of the clutch 259. By the provision of this relay, unnecessary wear and tear of the clutch 259 is avoided, but if the clutch is designed so that frequent operations do not cause excessive wear, the relay 256 may be omitted. In such a case, the #2 front contact of 257 is omitted and the #3 front contact is connected directly to clutch 259.

Although the "step-by-step switch" species of counter has been illustrated only in the circuit of Fig. 3 and the "vacuum tube and electrical delay network" species of timer has been shown only in the circuit of Fig. 4, it will be understood that the step-by-step switch may be substituted for the counting chain of Fig. 4 or 5. Similarly vacuum tubes and electrical delay networks may be employed as the timing means in Fig. 3. In fact it should be understood that any counting device and any timing means may be used in any of the circuits illustrated by modifying these circuits in suitable manner to adapt them to the characteristics of the timing and counting devices used.

While I have described particular embodiments of my invention for purposes of illustration it should be understood that various modifications and adaptations thereof may be made within the spirit of the invention as set forth in the appended claims.

What is claimed is:

1. An arrangement for responding to a predetermined sequence of signal pulses of particular length range and interspersed spaces of a definite maximum length, comprising a signal receiver, a mechanically driven dash timing means for determining the minimum and maximum duration of said dash, a mechanically driven space timing means operative for a predetermined period, a signal registering means for said received signals, means for setting said dash timing means into operation in response to reception of signal pulses by said receiver, means for setting said space timing device into operation in response to termination of reception of signals by said receiver if said received signal at least lasts the minimum duration, means for operating said signal register in response to the operation of said dash timing means for said minimum dash period, means tending to restore said register to normal in response to the operation of said space timing device for said predetermined period, means responsive to receipt of the succeeding signal pulse prior to the expiration of said predetermined period for preventing restoration by said space timing means while maintaining said means tending to restore operation, means operative in response to subsequent operation of said dash timing means for said minimum period for restoring said space timing means to unoperated condition and disabling said means tending to restore, means responsive to operation of said dash timer for a period greater than the maximum duration of said signal impulse for restoring said dash timer and register to unoperated condition, and means for delaying response of said arrangement to a subsequent received signal impulse until said dash timer is restored to normal.

2. An arrangement for responding to a predetermined sequence of signal pulses of particular length range and interspersed spaces of a definite maximum length, comprising a signal receiver, a mechanically driven dash timing means for determining the minimum and maximum duration of said dash, a signal registering means for said received signals, means for setting said dash timing means into operation in response to reception of signal pulses by said receiver, means for operating said signal register in response to the operation of said dash timing means for said minimum dash period, means responsive to operation of said dash timer for a period greater than the maximum duration of said signal impulse for restoring said dash timer and register to unoperated condition, and means for preventing response of said dash timer to any continuation of the received signal until said signal has been interrupted.

3. An arrangement for selectively responding to a predetermined signal sequence comprising signal pulses of predetermined time duration and spaces or intervals of predetermined maximum time, which comprises a signal receiver, a constantly rotating shaft, a signal timing device comprising progressively movable switching means, a clutch operated by incoming signal pulses for operatively associating said signal timing device with said rotary shaft, a register responsive to operation of said signal timing device to a predetermined position and subsequent restoration thereof for registering the received signal impulses, a space timing device comprising further progressively movable switching means, a second clutch operative upon cessation of said signal pulses for operatively associating said space timing device with said rotary shaft, means responsive to the subsequent operation of said signal timing device to a predetermined position for releasing said second clutch and restoring said space timing device, means responsive to cessation of said signal pulses before reaching a predetermined minimum duration for restoring said first clutch and said signal timing means to initial position, and means for restoring said register to unoperated position in response to operation of said spacing timing device to a predetermined position and subsequent operation of said means for restoring said first clutch.

WILLIAM WALTER MACALPINE.